Dec. 8, 1931. M. C. ARMSTRONG 1,835,452
APPARATUS FOR SOUNDING ALARMS
Filed June 10, 1931 2 Sheets-Sheet 1
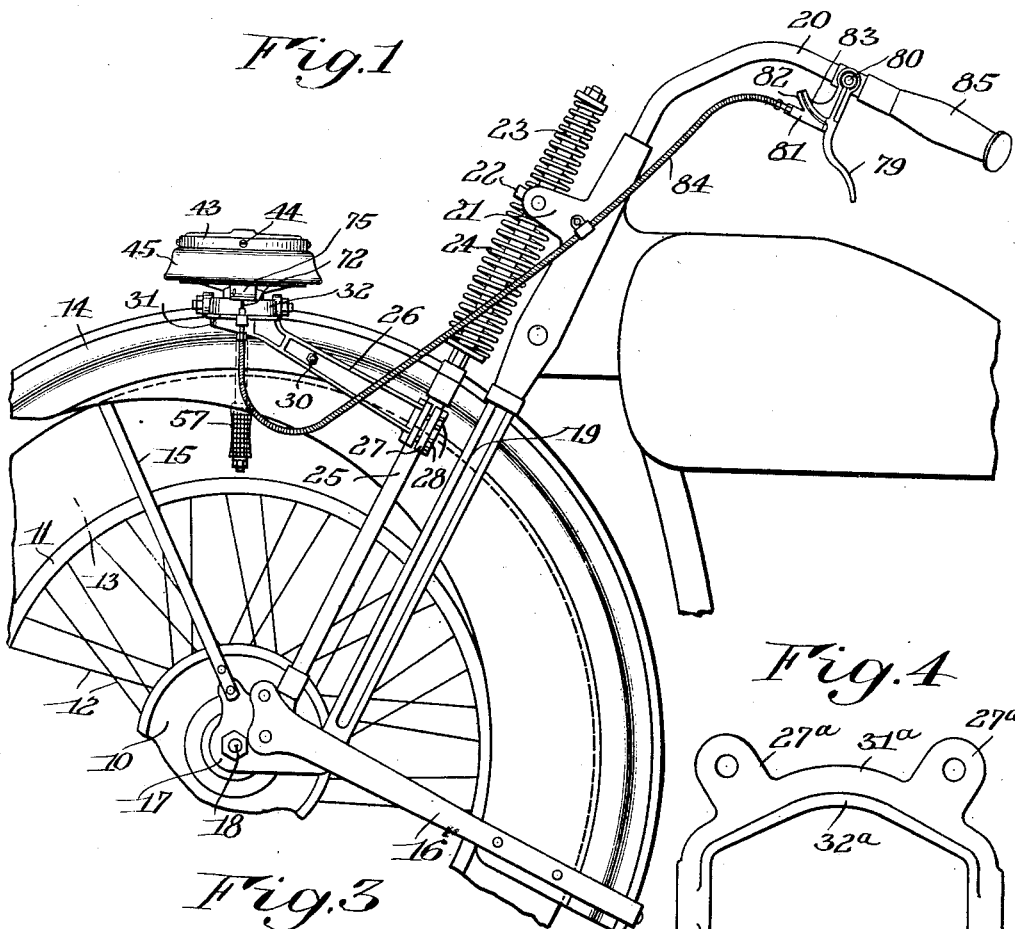
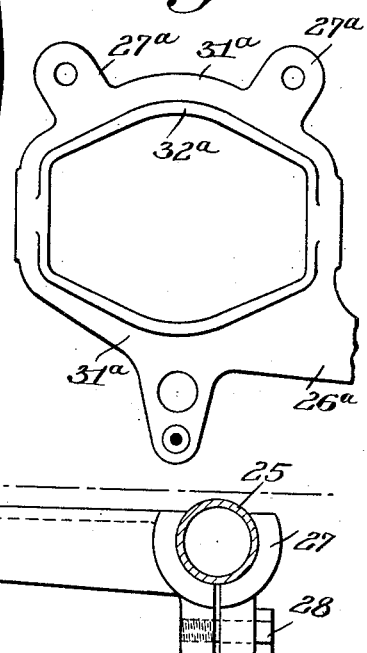
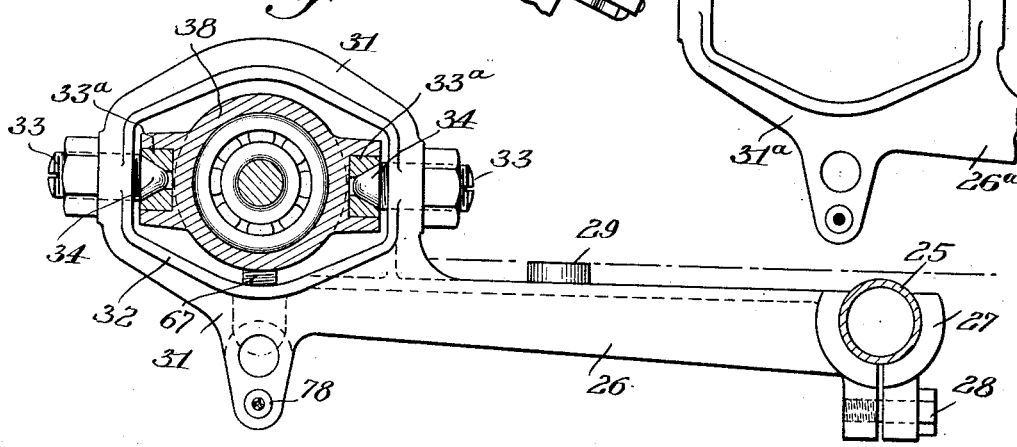
INVENTOR
Merton C. Armstrong
BY Edward H. Crumpton
his ATTORNEY

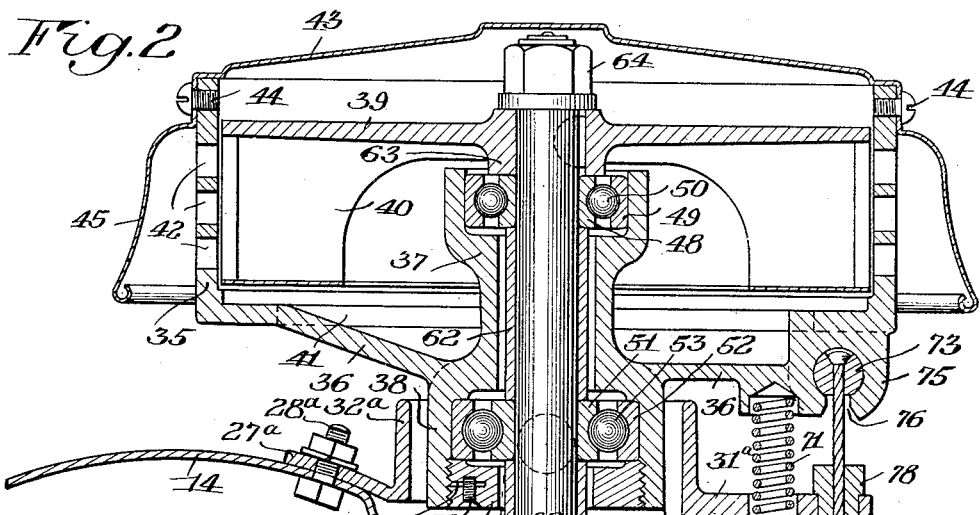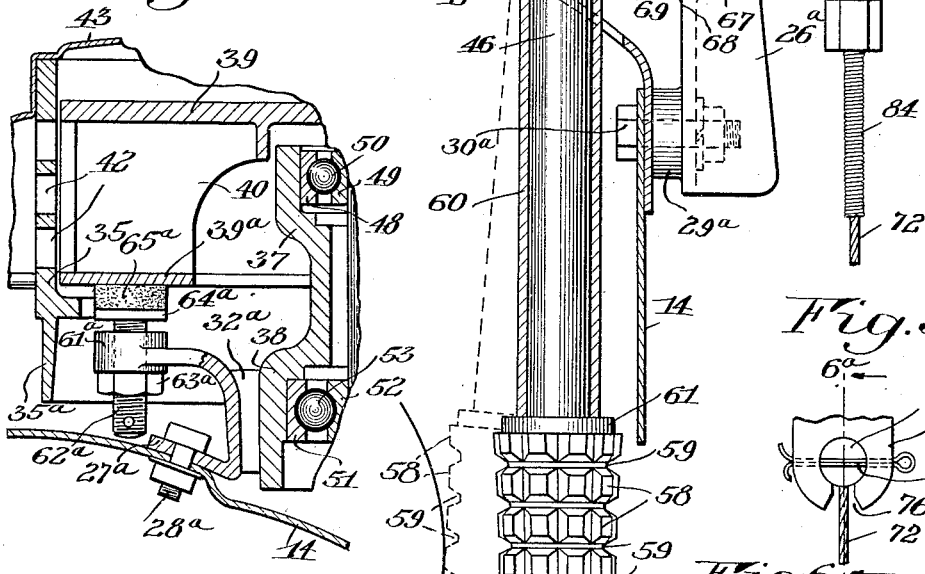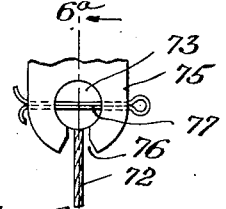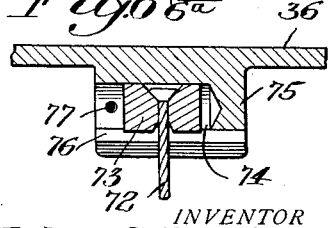

Patented Dec. 8, 1931

1,835,452

UNITED STATES PATENT OFFICE

MERTON C. ARMSTRONG, OF ROCHESTER, NEW YORK, ASSIGNOR TO THE STERLING SIREN FIRE ALARM COMPANY INC., OF ROCHESTER, NEW YORK, A CORPORATION OF NEW YORK

APPARATUS FOR SOUNDING ALARMS

Application filed June 10, 1931. Serial No. 543,419.

The present invention relates to apparatus for sounding alarms and has for its object more particularly to provide improvements in the siren type of sound producing apparatus designed for application to a motor driven vehicle for operation by one of the wheels thereof.

A further object of the invention is to provide an improved signalling or sounding device embodying a simple and efficient construction having comparatively few parts which can be manufactured and assembled at a relatively low cost.

A further object of the invention is to provide an improved siren designed for attachment to the frame or fender of a motor driven vehicle such for example, as a motorcycle and arranged to be driven through contact of an operating part thereof with one of the wheels of the vehicle.

A further object of the invention is to provide an improved mounting for the siren by which it can be readily attached to the fender of a motorcycle or like type of vehicle for convenient operation to a position at which it will be driven by one of the wheels of the vehicle.

A further object of the invention is to provide improvements in the operating and control means for the siren together with means designed to facilitate its application to and removal from the frame or fender of a motorcycle or other vehicle.

To these and other ends the invention resides in certain improvements and combinations of parts, all as will be hereinafter more fully described, the novel features being pointed out in the claims at the end of the specification.

In the drawings:

Fig. 1 is a fragmentary side elevation of a motorcycle to which the siren is shown applied;

Fig. 2 is a sectional elevation drawn to an enlarged scale and taken centrally through the siren;

Fig. 3 is a horizontal section illustrating the form of bracket shown in Fig. 1 for supporting the siren;

Fig. 4 is a plan view of a modified form of bracket for attaching the siren to the fender of the motorcycle;

Fig. 5 is a detailed view in elevation showing the manner of connecting the operating cable to the siren for swinging it to move the driving shaft to the dotted line position shown in Fig. 2;

Fig. 6 is a detailed sectional elevation taken on line 6a—6a of Fig. 5, and

Fig. 7 is a fragmentary sectional elevation showing a modified brake arrangement for the rotor of the siren.

Similar reference numerals throughout the several views indicate the same parts.

Referring to the drawings, 10 represents the hub, 11 the rim, and 12 the spokes of the front wheel of a motorcycle or other motor driven vehicle. The tire 13 of the wheel has a fender 14 overlying the same which is carried by the oppositely extending arms 15 and 16 attached at their inner ends to the frame supporting plate members 17 carried by the axle 18, Fig. 1. Connected with said plate members is the rear fork 19 of the frame provided with the usual handle-bars 20 for steering the motorcycle. The fork is provided with forwardly extending lugs 21 connected with a follower 22 positioned between springs 23 and 24 on the upper end of the front fork 25 of the frame which is also connected with the plate members 17 at opposite sides of the wheel.

A support or bracket 26 extends forwardly from one arm of the fork 25 and is rigidly attached thereto by a clamping member 27 detachably connected with the bracket by bolts 28 as shown in Figs. 1 and 4. The bracket is provided with a boss 29 seated upon the side wall of the fender upon which the bracket is clamped by a bolt 30.

In the modified siren supporting bracket shown in Fig. 4 and described hereinafter, the construction is the same as that shown in Fig. 3 except that the arm portion in rear of the bolt 30 attached to the front fork 25 is omitted and two securing lugs employed instead which are connected with the fender in a manner subsequently described so that while in one case the bracket is directly connected both with the fork and fender, in the other it is connected with the fender only.

The siren carrying portion of the bracket shown in Fig. 3 preferably constitutes what may be termed a ring-shaped member comprising a horizontally disposed plate-like portion 31 having an upstanding wall 32 provided with front and rear adjustable pivot bolts 33 the inner ends of which are preferably tapered as indicated at 34 to afford pivot bearings upon which the siren is mounted to swing as described hereinafter.

The siren comprises a stator having an annular body portion 35 provided at its lower end with a supporting spider including radially extending arms 36 carrying upper and lower extensions forming bearing housings 37 and 38 respectively, the former lying within the body of the stator and the latter beneath the same. The lower housing is recessed at its opposite sides for the reception of the socket members 33a arranged to receive the tapered portions 34 of the pivot bolts 33 as shown in Fig. 3 to permit the siren to swing between predetermined positions.

Disposed within the body of the stator is the rotor 39 having a series of blades 40 which when rotating draw in air through openings 41 formed in the lower end of the stator between the spider arms 36, the air being forced outwardly through the ports 42 in the side wall of the stator to produce the sound blasts in the usual manner.

The stator is closed at its upper end by a cover plate 43 connected therewith by screws 44 and having a downwardly extending skirt 45 spaced from and surrounding the stator as shown in Fig. 2.

The rotor 39 is keyed to the upper end of the driving shaft 46 which extends downwardly through the bearing housings 37 and 38 and through an opening 47 in the upper wall of the fender 14 as shown in Fig. 2. The shaft is rotatably supported by upper and lower bearings within said housings. The upper bearing comprises inner and outer ring-shaped elements 48 and 49 with the usual steel balls 50 therebetween and the lower bearing comprises the inner and outer ring-shaped elements 51 and 52 with the steel balls 53 therebetween.

The outer bearing ring 52 is secured within the housing 38 by a threaded retaining element 54 which is slotted at 55 to afford oppositely disposed portions connected by a clamping screw 56 which affords a binding action between the threads of the retaining element and those of the housing whereby to prevent said retaining element from working loose.

The rotor shaft is provided at its free end with an operating or driving element indicated generally at 57 and preferably comprising a casting having a plurality of rows of radially disposed teeth-like portions 58, said rows being separated by V-shaped grooves 59 as shown in Fig. 2. The driving element is preferably of smaller diameter at its center than at its end, or in other words is of concave construction whereby to better conform to the convex surface of the tire when in engagement therewith.

Mounted on the shaft between the driving element and the inner bearing element 51 is a sleeve 60 at the lower end of which is a washer 61 resting on the driving element. Also mounted on the shaft and between the inner bearing elements 48 and 51 is a sleeve 62. Engaging the upper surface of the bearing element 48 is the hub 63 of the rotor 39, Fig. 2. At the upper and lower ends of the shaft are nuts 64 and 65, respectively, which serve to clamp the rotor and driving element and parts therebetween together, said parts including the sleeves 60 and 62 and the bearing elements 48 and 51 whereby to afford a rigid driving unit for the rotor for operation by the tire 13 of the front wheel of the motorcycle.

The supporting bracket shown in Figs. 2 and 4 has an arm-like portion 26a provided with a boss 29a seated on the side wall of the fender and clamped thereon by a bolt 30a. The arm-like portion forms a support for the horizontal plate portion 31a of the bracket which carries the upstanding ring-like member 32a provided with pivot bolts 33 corresponding to those shown in Fig. 3. A pair of lugs 27a are formed on the horizontal portion 31a of the bracket and are connected with the upper wall of the fender by bolts 28a as shown in Fig. 2.

The sleeve 60 on the rotor shaft is provided with a brake 66 formed of any suitable material and carried by a bolt 67 threadedly engaging the bracket and held in adjusted position thereon by a lock nut 68 as shown in Fig. 2. The brake element is secured upon a plate 69 on the end of the bolt by a clamping screw 70 threaded within the bolt. The bolt 67 is made adjustable to compensate for the wear of the brake element. The brake just described is also used with the bracket shown in Fig. 1, the construction and application of the brake being the same in both cases. In addition to operating as a brake for reducing the speed of the shaft when the siren is returned to normal position the element 66 also serves as a stop for holding the siren in release position, at which it is held by a spring 71. The spring is interposed between one of the arms 36 of the spider at the bottom of the stator and the horizontal plate portion of the bracket, its lower end being seated within a recess formed in said plate portion as shown in Figs. 2 and 3.

The operating means for swinging the siren to move the shaft to the dotted line position shown in Fig. 2 comprises a cable 72 having a head 73 thereon mounted within a recess 74 formed in a lug 75 on the bottom of the stator. The recess communicates with a slot 76 in the bottom of said lug and through which the cable extends as shown in Figs. 5 and 6. The head is slidably received within the recess and is held therein preferably by a cotter pin 77 as shown in Fig. 5.

The cable extends through and is guided by a sleeve 78 suitably attached to either of the plates 31 and 31a of the brackets shown in Figs. 3 and 4, respectively, depending on which form of bracket is used. The opposite end of the cable is suitably connected with a hand lever 79 pivoted at 80 upon a bracket 81 secured to one of the handle-bars 20 by any suitable means. The cable extends through and is guided by the lower end of the bracket 81 in advance of the point where it is connected with the lever. The bracket is provided with an arcuate portion 82 arranged to receive and guide a corresponding arcuate portion 83 of the lever as shown in Fig. 1. The cable is preferably enclosed in a flexible casing or cover 84 constructed in any suitable manner. The lever 79 is disposed adjacent the hand grip 85 of the handle-bar so that the driver or operator of the vehicle may be moving the lever inwardly toward the hand grip, exert a pull on the cable whenever it is desired to swing the siren into position to be operated by the tire 13 of the revolving wheel. Upon release of the lever the spring 71 will immediately return the siren to normal position where the brake 66, through frictional contact with the sleeve 60 will quickly discontinue operation of the shaft which at this time is rotated under the momentum imparted to it by the wheel.

With either of the brackets provided for supporting the siren the latter can be readily removed as a unit without detachment of the bracket, merely by withdrawing the pivot bolts 33 sufficiently to permit the siren to be lifted and removed from the fender, after first disconnecting the cable by removing the cotter pin 76 and withdrawing the slide 73.

The novel arrangement of parts for supporting the rotor drive shaft facilitates a quick assembly and removal of the same. With this arrangement, by removing the cover 43 of the stator and the nut 65, the shaft and rotor can be quickly withdrawn from its bearings. The shaft can thus be readily detached, should it become necessary to make repairs, and the parts reassembled in a comparatively short time. By clamping the various parts on the shaft between the rotor and driving member 57, including the sleeves and inner bearing elements 48 and 51, a rigid drive structure is afforded, thus avoiding the use of any loosely connected parts between the rotor and the wheel of the vehicle. The use of the sleeve 60 on the shaft also serves to protect the latter from wear by preventing the brake element from coming into contact therewith.

The advantage of the particular mounting of the siren shown is that it permits the siren to be placed as close to the fender as possible, the pivotal axis being at approximately the minimum distance from the fender and the construction being such that the body of the siren is also placed relatively close to said axis. The closing of the top of the siren and the intake of the air through the bottom wall considerably reduces the distance at which the siren projects above the fender. Furthermore, the arrangement of the drive shaft bearings is such as to greatly reduce the distance between the top of the siren and its pivotal axis, this being made possible by placing the upper bearing within the stator at a point well above the bottom wall thereof so as to permit the lower bearing to be placed relatively close to said wall. It will be seen, therefore, that this construction is one of a very compact nature affording a reduction in the amount of material used and permitting the weight of the siren to be brought close to the fender and relatively close to the axis of the wheel.

The modification shown in Fig. 7 embodies a construction which is generally similar to that shown in Fig. 2, and the corresponding parts have therefore been given the same reference characters. In this arrangement the location of the brake has been changed and the stator has been provided with a depending skirt portion for a purpose described hereafter.

Instead of mounting the brake for application to the sleeve 60 of the rotor shaft as shown in Fig. 2, I may position it for engagement with the bottom plate 39a of the rotor, as shown in Fig. 7. In this modification the siren supporting bracket is the same as that shown in Fig. 2 except that it is provided with a laterally extending portion 61a having threaded therein a screw 62a held in adjusted position by a lock nut 63a. The screw carries a plate like member 64a to which is attached in any desired manner the brake element 65a, which may be formed of any suitable material. The position of the brake element is such that when the spring 71 operates to shift the siren from operative to inoperative position the bottom plate 39a of the rotor will engage said brake element whereby the revolving parts will be quickly brought to rest.

Another feature of the modified form of construction shown in Fig. 7 is that of providing a depending flange or skirt 35a on the body portion 35 of the stator, which increases the distance between the discharge ports 42 of the stator and the lowest point of intake for the air drawn into the stator by the revolving fan or rotor. By increasing the distance between the intake and discharge points of the siren in this manner the possibility of any conflict between the inflowing and discharging currents of air is avoided. Furthermore, the depending flange or skirt forms protecting means tending to prevent the drawing in of foreign matter by the suction created by the revolving rotor.

While the present siren is particularly adapted for use with motorcycles it may also be used on other types of motor driven vehicles where it is desired to operate it by one of the wheels of the vehicle.

I claim:

1. In apparatus of the class described, the combination with the wheels and frame of a motor vehicle, of a siren comprising a stator closed at its top and having air inlet and discharge openings in its bottom and side walls, a rotor within the stator having a driving member arranged for operation by one of said wheels, a depending extension on the stator having bearings formed in its opposite sides, a mounting on the frame for the siren having spaced trunnions extending transversely of the rotor driving member and engaging in said bearings and permitting the siren to swing about an axis transverse to the axis of the rotor to a position at which the driving member will be operated by said last mentioned wheel, and means for moving the siren to said position.

2. In apparatus of the class described, the combination with one of the wheels of a motor vehicle, of a fender for said wheel, a siren comprising a stator closed at its top and having air inlet and discharge openings in its bottom and side walls, a rotor within the stator having a driving shaft normally spaced from said wheel and arranged to engage and be operated thereby, a support for the siren located between the stator and the fender, the siren being mounted to swing upon the support about an axis transverse to the axis of the rotor, means for swinging the siren from normal position to move the shaft into engagement with said wheel comprising a cable having one end extending upwardly through and guided by the support and connected with the stator, and means for returning the siren to normal position comprising spring means seated upon the support and extending upwardly into engagement with the stator.

3. In apparatus for the class described, the combination with the wheels and frame of a motorcycle provided with steering means, of a fender for one of the wheels, a siren comprising a stator closed at its top and having air inlet and discharge openings in its bottom and side walls, a rotor within the stator having a driving member, a mounting on the fender for the siren permitting the siren to swing about an axis transverse to the axis of the rotor to a position at which the driving member will engage the last mentioned wheel for operation thereby, means for moving the siren to said position including an operating part upon the steering means, and means for returning the siren to normal position upon release of said operating part.

4. In apparatus of the class described, the combination with the wheels and frame of a motorcycle provided with steering means including handle-bars, of a fender for one of the wheels, a siren comprising a stator closed at its top and having air inlet and discharge openings in its bottom and side walls, a rotor within the stator having a driving shaft extending through the wall of the fender and provided with an operating portion arranged in one position of the siren to engage and be driven by the last mentioned wheel, means supporting the siren upon the fender for a swinging movement to said position about an axis transverse to the axis of the rotor, and means for moving the siren to said position including an operating part on one of the handle-bars.

5. In apparatus of the class described, the combination with the front and rear wheels of a motorcycle and its frame including a fork supported by the front wheel, of a fender for said front wheel, a bracket connected with said fork at one point and with the fender at another point, a siren mounted on the bracket including a stator and a rotor provided with a driving element arranged in one position of the siren to engage and be driven by said front wheel, the siren being mounted to swing upon the bracket about an axis transverse to the axis of the rotor, manually controlled operating means for effecting movement of the siren to said position, and means for returning the siren to inoperative position upon release of said operating means.

6. In apparatus of the class described, a siren arranged for connection with the fender of one of the wheels of a motor driven vehicle, comprising a stator closed at its top and having air inlet and discharge openings in its bottom and side walls, bearings supported by said bottom wall at opposite sides thereof, a rotor within the stator having a drive shaft extending downwardly through said bearings and arranged for engagement with and operation by said wheel in a predetermined position of the siren, means arranged to support the siren on the fender for a swinging movement about a horizontal axis to and from said predetermined position, and means for swinging the siren upon the supporting means.

7. In apparatus of the class described, a siren arranged for connection with the fender of one of the wheels of a motor driven vehicle, comprising a stator closed at its top and having air inlet and discharge openings in its bottom and side walls, a rotor within the stator having a drive shaft extending downwardly through the stator and arranged for engagement with and operation by said wheel in a predetermined position of the siren, means arranged to support the siren on the fender for a swinging movement about a horizontal axis to and from said predetermined position, means for swinging the siren to said position, a brake for the rotor shaft carried by said supporting means arranged to engage the shaft when the siren is swung from said predetermined position to an inoperative position, and means for yieldingly holding the siren at inoperative position.

8. In apparatus of the class described, a siren arranged for connection with the fender of one of the wheels of a motor driven vehicle comprising a stator closed at its top and having air inlet and discharge openings in its bottom and side walls, a hood extending downwardly around the side wall of the stator in spaced relation thereto, upper and lower bearings carried by said bottom wall, a rotor within the stator having a drive shaft extending downwardly through said bearings and arranged for engagement with and operation by said wheel in a predetermined position of the siren, a bracket for supporting the siren upon the fender having horizontally disposed pivot members on which the siren is mounted to swing between said predetermined position and an inoperative position, means for swinging the siren to said predetermined position, a brake for the shaft adjustably mounted upon the bracket, and means for returning the siren to inoperative position at which the brake will engage the shaft.

9. In apparatus of the class described, a siren arranged for connection with the fender of one of the wheels of a motorcycle, comprising a stator closed at its top and having air inlet and discharge openings in its bottom and side walls, said bottom wall having bearing housings thereon, one projecting upwardly into the stator and the other extending below the same, bearings within said housings, a rotor within the stator having a drive shaft extending downwardly through said bearings and arranged to project through the fender for engagement with and operation by said wheel in a predetermined position of the siren, a support for the siren arranged for attachment to the fender, means pivotally connecting said lower bearing housing with the support and permitting the siren to swing about a horizontal axis to said predetermined position, and means for moving the siren to and from inoperative position.

10. In apparatus of the class described, a siren arranged for connection with the fender of one of the wheels of a motorcycle, comprising a stator closed at its top and having air inlet and discharge openings in its bottom and side walls, spaced bearings carried by the bottom of the support, a rotor within the stator having a drive shaft extending downwardly through said bearings arranged for engagement with and operation by said wheel when the siren is moved from a normally inoperative position to a predetermined operating position, a bracket for supporting the siren having a body portion provided with a depending part at one side and a laterally extending part at another side, each of said parts being arranged for attachment to the fender, means supporting the siren on said body portion for a swinging movement about a horizontal axis between said positions, a brake for the drive shaft connected with said depending part of the bracket in position to engage the shaft when the siren is returned to inoperative position, means for moving the siren to said predetermined position, and means for returning it to inoperative position.

11. In apparatus of the class described, a siren comprising a stator closed at its top and having air inlet and discharge openings in its bottom and side walls, a rotor within the stator having a drive shaft projecting through one end of the stator, a bracket arranged for attachment to the fender of one of the wheels of the motor driven vehicle, means for supporting the siren on the bracket for a swinging movement about a horizontal axis from a normal inoperative position to a predetermined position at which the shaft is arranged to be driven by said wheel, a cable for moving the siren to said predetermined position having a head thereon slidably received in a recess formed in one of the walls of the stator and detachably held in said recess, a brake for the drive shaft, and spring means for returning the siren to normal inoperative position at which the brake will frictionally engage the shaft.

12. In apparatus of the class described, a siren comprising a stator, a rotor mounted therein having a drive shaft projecting through one end of the stator, said end having a laterally extending part surrounding the shaft, a support for the siren arranged for attachment to the fender of one of the wheels of a motor driven vehicle, said support having wall portions at opposite sides of said laterally extending part of the stator, adjustable pivot members for supporting the siren interposed between said wall portions and the laterally extending part of the stator whereby to permit the stator to swing to a position at which the shaft will be operated by said wheel, said pivot members when adjusted to a predetermined position permitting the siren to be withdrawn from the support, and means for moving the siren to said position.

13. In apparatus of the class described, a siren comprising a stator, a rotor mounted therein having a drive shaft projecting through one end of the stator, said end having a laterally extending part surrounding the shaft, a support for the siren arranged for attachment to the fender of one of the wheels of a motor driven vehicle, said support having a wall portion substantially surrounding said laterally extending part of the stator, pivot members for the siren adjustable within said wall portion and having their inner ends engaging within recesses formed in opposite sides of said laterally extending part of the stator whereby to support the siren for a swinging movement about a horizontal axis to a predetermined position at which the shaft will be operated by said wheel, said pivot members being adjustable to positions permitting withdrawal of the stator from the support, means for holding the siren at normal inoperative position, and means for swinging it to said predetermined position.

14. In apparatus of the class described, a siren comprising a stator, a rotor mounted therein having a drive shaft projecting through one end of the stator, said end having a laterally extending part surrounding the shaft, a support for the siren arranged for attachment to the fender of one of the wheels of a motor driven vehicle, said support having a ring shaped portion in which the extended part of the stator is disposed, separate pivot members threaded in the ring shaped portion of the support and projecting within the extended part of the stator and permitting the stator to swing about an axis transverse to the axis of the shaft to a predetermined position at which the shaft will engage and be driven by said wheel, and means for swinging the siren to said position.

15. In apparatus of the class described, a siren comprising a stator, a rotor mounted therein having a drive shaft projecting through and journaled in the stator, said stator at the end through which the shaft projects having a laterally extending part surrounding the shaft and provided with bearings in its opposite sides, a support for the siren arranged for attachment to the fender of one of the wheels of a motor driven vehicle, said support having oppositely disposed wall portions between which the laterally extending part of the stator is disposed, pivot members threaded within said wall portions and having their inner ends projecting within the bearings of the laterally extending part of the stator whereby to support the siren for a swinging movement about an axis transverse to the axis of the shaft to a position at which said shaft will engage and be driven by said wheel, and means for moving the siren to said position.

16. In apparatus of the class described, a siren comprising a stator, a rotor within the stator, said stator being closed at its top and having openings in its bottom and side walls for the entrance and discharge of air, the bottom of the stator having upper and lower bearing receiving portions, bearings mounted within said portions, a drive shaft connected with the rotor and extending through said bearings, a support for the siren arranged for attachment to the fender of one of the wheels of a motor driven vehicle, said support having a part in which said lower bearing receiving portion is disposed, separate pivot members carried by said part and pivotally supporting the lower bearing receiving portion of the stator and permitting the stator to swing to a predetermined position about an axis transverse to the axis of said drive shaft, said shaft having an operating portion thereon arranged when the siren is swung to said predetermined position to be driven by said wheel, and means for swinging the siren to said position.

17. In apparatus of the class described, a siren comprising a stator closed at its top and having openings in its bottom and side walls for the admission and discharge of air, a rotor within the stator for drawing in and expelling the air through said openings, said rotor having a drive shaft projecting through one end of the stator, said end having a laterally extending part surrounding the shaft, a supporting bracket for the siren arranged for attachment to the fender of one of the wheels of a motorcycle and having a ring shaped body portion provided at one side with a depending arm adapted for engagement with the side wall of the fender and having at an opposite side a substantially horizontal plate portion arranged for engagement with the transversely extending portion of the fender, the laterally extending part of the stator being positioned within the ring shaped body portion of the bracket, separate pivot members for the stator detachably carried by the opposite sides of said body portion and permitting the stator to swing to a position at which the shaft will be driven by said wheel, and means for swinging the stator to said position.

18. In apparatus of the class described, a siren comprising a rotor, a stator enclosing said rotor and having an end wall provided at its opposite sides with spaced bearings each including inner and outer bearing elements, a drive shaft for the rotor extending through and rotatably supported by the bearings, an operating member on the free end of the shaft, a spacing sleeve on the shaft between said inner bearing elements, a second sleeve on the shaft serving as a spacing member between the operating member and the inner bearing element nearest thereto, bracket means for pivotally supporting the siren upon the fender of one of the wheels of a motorcycle for a swinging movement to a position at which the operating member will engage the wheel, and operating means for swinging the siren to said position.

19. In apparatus of the class described, a siren, a supporting bracket for the siren arranged for attachment to the front fork and fender of a motorcycle and including a ring shaped member, pivot members carried by opposite portions of said ring shaped member, said siren comprising a rotor and a stator, said stator having a part disposed within said ring shaped member upon said pivot members for a swinging movement thereon, a drive shaft for the rotor extending through said ring shaped member and arranged in one position of the siren to be operated by one of the wheels of the motorcycle, actuating means for moving the siren to said position from a normal inoperative position, and means for returning the siren to inoperative position upon release of said actuating means.

20. In apparatus of the class described, a siren, a support for the siren arranged for attachment to a motorcycle frame, said siren comprising a stator and a rotor, upper and lower bearings carried by the stator, a drive shaft for the rotor extending through and rotatably supported by the bearings, a sleeve upon the shaft having its opposite ends engaging said bearings, a second sleeve on the shaft having its upper end engaging the lower bearing, an operating member for the shaft detachably mounted on the free end thereof and engaging the lower end of the second sleeve, said operating member having a plurality of rows of radially extending teeth like portions arranged for engagement with the tire of one of the wheels of the motorcycle for operation thereby, means for holding said operating member in position upon the shaft to clamp the sleeves in engagement with said bearings, and pivot means interposed between said support and stator permitting the latter to swing about an axis transverse to the axis of the rotor to move the operating member into engagement with said wheel.

21. In apparatus of the class described, the combination with the wheels and frame of a motor vehicle, of a siren comprising a stator, a rotor within the stator having a drive shaft arranged for operation by one of said wheels, a mounting on the frame for the siren permitting the siren to swing to operating position at which the drive shaft will engage said last mentioned wheel, means for moving the siren from operative to inoperative position, a brake mounted independently of said shaft in position to be engaged by the rotor when the siren is moved to inoperative position, and means for moving the siren to operative position.

22. In apparatus of the class described, the combination of supporting means, a siren movable upon the supporting means comprising a stator and a rotor, a driving element for the rotor arranged for operation by power driven means when the siren is moved from a normal inoperative position to an operative position with respect to said power driven means, means for moving the siren to said operative position, means for returning it to inoperative position, and a brake mounted independently of said driving element in position to be engaged by the rotor when the siren is returned to inoperative position.

23. In apparatus of the class described, the combination of supporting means, a siren comprising a stator and a rotor mounted to swing upon the supporting means about an axis transverse to the axis of the rotor, said rotor having a driving element extending therefrom arranged for operation by a rotary power driven element in a predetermined position of the siren with respect to said power driven element, means for swinging the siren to said position from a normal inoperative position, a brake mounted on the supporting means independently of said driving element in position to be engaged by the rotor when the siren is swung from said predetermined position to said inoperative position, yieldable means for swinging the siren to said inoperative position, and means for swinging it to said predetermined position.

MERTON C. ARMSTRONG.